May 11, 1948.  E. F. SARVER  2,441,252

VALVE

Filed Oct. 30, 1944  2 Sheets-Sheet 1

Inventor
Emmett F. Sarver.
By Fishburn & Mullendore
Attorneys

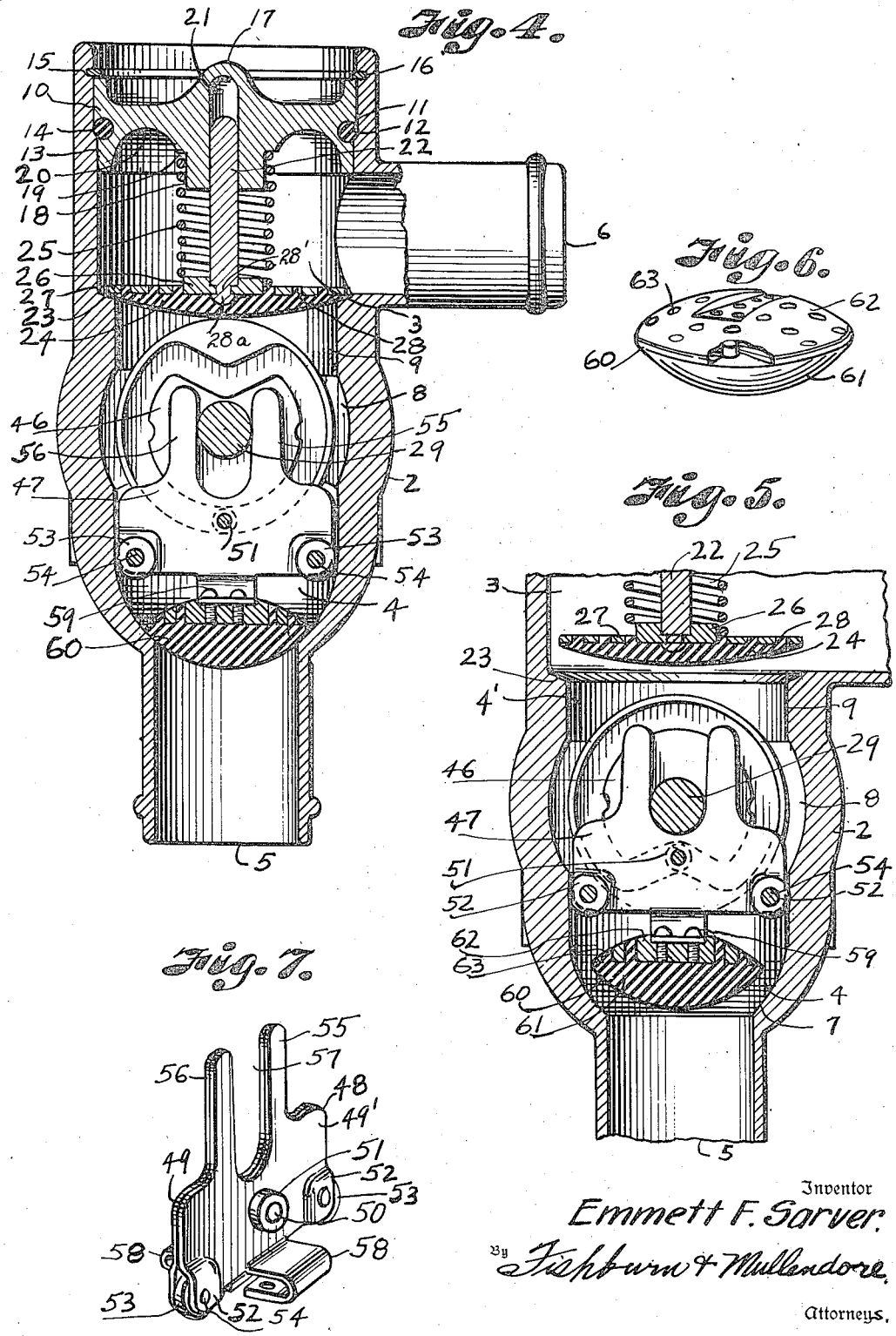

Patented May 11, 1948

2,441,252

UNITED STATES PATENT OFFICE 2,441,252

VALVE

Emmett F. Sarver, Erie, Pa., assignor to Rohlm Manufacturing Company, Inc., Erie, Pa., a corporation of Kansas Application October 30, 1944, Serial No. 561,039

2 Claims. (Cl. 251—39)

This invention relates to valves and more particularly to valves of the multiple type adapted for use in metering gasoline or other fluids requiring positive action for opening and closing the valves.

Heretofore in valves of this type it has been customary to provide springs for moving the valve in one direction, which springs were not accurate or positive in their action, thus the valves did not have positive or accurate action.

The objects of the present invention are to provide a valve having positive action for opening and closing the valve; to provide a double-acting cam for opening and closing said valve; to provide cams which act as an index for determining open and closed position of the valve; to provide a valve without sliding action in the valve parts; to provide valve parts for reducing the friction and lessening the danger of wearing away the anodizing plating or other protective coating on such parts; to provide a valve having a streamlining effect to aid in the flow of fluid therethrough; to provide a valve having no sharp edges or corners within the valve thus lessening pressure drop across the valve; to provide a plurality of valves in alignment operated alternately by cam action; and to provide a valve simple, economical and operating in an efficient manner.

In accomplishing these and other objects of the invention I have provided improved details of structure the preferred forms of which are shown in the accompanying drawings, wherein:

Fig. 4 is a vertical cross-sectional view through one of the valve members showing it in closed position.

Fig. 5 is a view similar to Fig. 4 in open position.

Fig. 6 is a perspective view partly in cross section of the poppet member.

Fig. 7 is a perspective view of the guide member forming part of my invention.

Referring more in detail to the drawings:

1 designates a valve assembly embodying the features of my invention preferably of multiple type and here illustrated as having two valve openings, although it will be obvious that any suitable number may be used without departing from my invention. The assembly consists of a body or housing member 2 for a plurality of valves, each having chambers 3 and 4 and throat 4' therein, a fluid inlet 5 and a fluid outlet 6. As the structure in each valve chamber and the operation is the same, I will, in describing my invention, refer to only one structure in such chambers.

Figure 1:
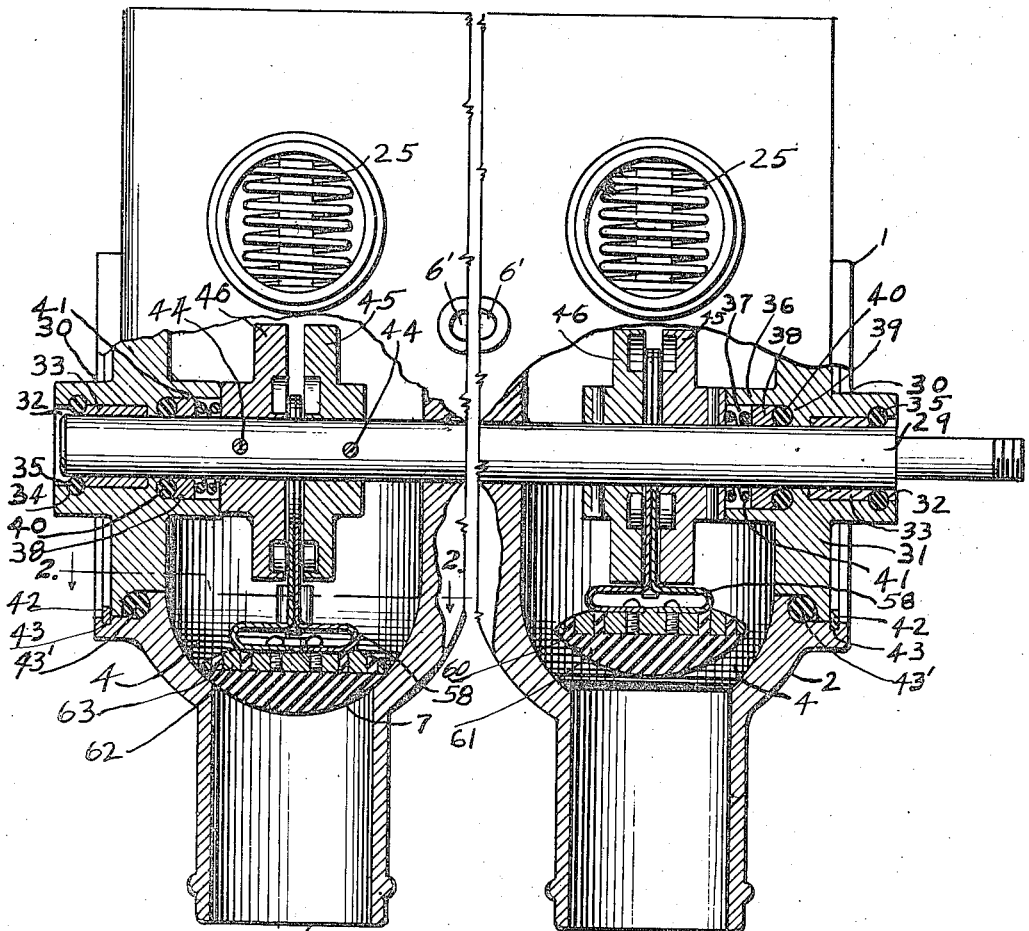
Fig. 1 is a side elevational view, partly in cross section illustrating my invention, showing the housing for the valves in broken lines.
Figure 2:
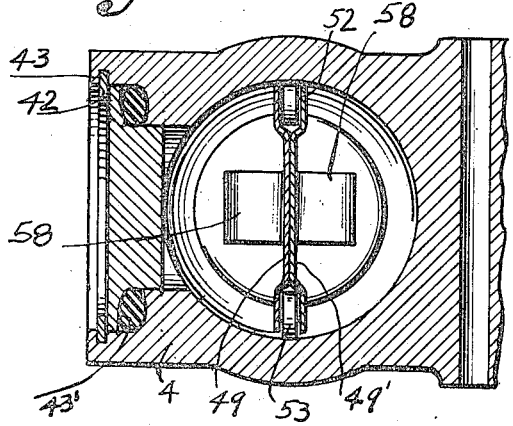
Fig. 2 is a transverse sectional view taken on a line 2—2, Fig. 1.
Figure 3:
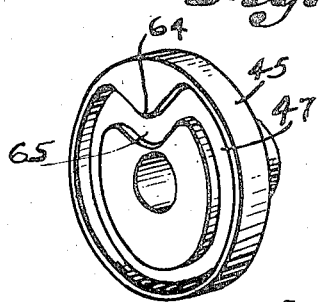
Fig. 3 is a perspective view of my cam member.

In Fig. 1 I have illustrated two valves with the housing shown in broken lines to indicate that additional valves may be combined between the two shown.

It will be obvious that the housing for the respective chambers for the valve mechanism forming the plurality of valves may be fastened together in any ordinary manner as by bolts or otherwise through openings 6' in the housing (Fig. 1).

The chamber 4 has a rounded portion as indicated at 7 terminating in the inlet port 5. The center of the chamber 4 is cylindrical shaped as indicated at 8 terminating in an elongated portion 9 forming the throat 4'. The chamber 3 is preferably cylindrical in shape and has a plug 10 fitting in the body 2 forming one end of said chamber 3. The plug is provided with an annular groove 11 around the outer circumference of said plug adapted to receive a ring 12 preferably made of rubber or other resilient material. The plug is provided with a reduced portion 13 around its outer circumference so that when the plug is inserted in the body 2 with the ring in said annular groove, the ring engages the rounded shoulder 14 in said body providing a seal for said chamber. The plug is held in the body by a split snap ring 15 adapted to engage in an annular groove 16 around the inner periphery of said body. The plug 10 is also preferably provided with an enlarged central portion having a dome 17 and the opposite side provided with a boss 18 having an annular shoulder 19 at the base thereof and a rounded portion 20 providing a streamlining effect to said chamber.

By reference to Fig. 4 it will be noted that the chamber 3 is opposite from the outlet port 6 of the chamber. The enlarged central portion of the plug is provided with a bore 21 adapted to receive a pin 22. The chamber 3 is provided with an annular shoulder 23 and affixed to the outer end of the pin 22 is a poppet 24. A coil spring 25 engages over the boss 18 and has its opposite end engaging a plate 26 of the poppet for exerting pressure on said poppet so that it will engage on the shoulder 23 providing a check valve in said chamber.

The poppet 24 is preferably made of rubber or other resilient material and is fixed to a metal plate 27 having openings 28 therein. The fixed plate is provided with a boss and is fixed on the end of the pin 22. The end of the pin has a stem 23' and the metal plate is adapted to engage over the stem and be held thereon by forming of a head 28a on the end of the stem. The openings in the plate are provided so that the rubber during the vulcanizing process will flow into said holes providing a bond and anchorage of the rubber to the metal.

I also preferably provide a shaft 29 extending transversely through the rounded portion 8 of the chamber 4 and through openings 30 in the sides thereof adapted to be sealed therein by flange fittings 31 having a bore 32 in their outer ends adapted to receive a bearing 33. The inner circumference of the flange fitting 31 is provided with an annular groove 34 adapted to receive a ring 35, preferably made of rubber or other resilient material, which engages the shaft 29 and the bearing 33 to provide a seal around said shaft.

The inner end of the flange fitting 31 is provided with a hub or sleeve 36 having a bore 37 therein adapted to receive a gland 38 extending around said shaft. The inner end of the bore is rounded as at 39 and adapted to receive a ring 40, also made of rubber or other resilient material. I also preferably provide a coil spring 41 adapted to fit around the shaft 29 in said bore to exert pressure on the gland 38 to hold the gland securely against the rubber ring 40 to provide a further seal around said shaft in said fitting. The flange fittings 31 are held in place in the openings in the body of the housing by split snap rings 42 engaging in grooves 43 in said body. I also preferably provide a ring 43' for sealing the flange fittings 31 in the openings 30 in the valve housing.

Arranged on the shaft 29 and preferably by pins 44 is a pair of cam members 45 and 46 each having a track or groove 47 in the inner face thereof. The cams 45 and 46 are arranged on the shaft so that the sides having the cam tracks 47 will face each other and the tracks will therefore align.

A guide 48 preferably comprising plates 49 and 49' are held together by a rivet 50 and the outer ends of which extend beyond said plates are adapted to carry rollers 51. The lower edges of the guide are each provided with outwardly extending ears 52 adapted to receive a guide roller 53 secured in said ears by pin 54. The guide is also preferably provided with outwardly extending arms or posts 55 and 56 forming a guideway 57. The guide 48 is arranged for insertion between the cams 45 and 46 so that the guideway 48 engages the shaft 29, the guideway providing a bearing way for the shaft when the guide is raised or lowered as later described. When the guide is located between said cams, the roller 51 on each side of the guide will be engaged in the cam track 47 in said cam thus holding the guide in position between the cams and the upstanding posts one on either side of the shaft. When the guide is inserted between the cams the outer edges of the body portions of said guide are adapted to fit in the chamber 4 and the roller 53 will contact the edges of said chamber to act as a guide for the guide member.

Rigidly secured to the respective plates 49 and 49' of said guide member substantially mid-way between the ears 52 is a U-shaped member 58 preferably made of resilient material such as spring steel or the like for a purpose later described. Attached to the U-shaped member by screws or the like 59 is a poppet 60 adapted for engaging in the cylindrical chamber 4 for opening or closing the port opening 5. The poppet member is preferably made of slightly bulb shape and consists of a rubber portion 61 rounded on its surface to fit in the port opening and seal off fluids therefrom. I preferably provide a base 62 for said poppet preferably made of metal or any suitable material through which the screws are extended. The base member 62 is provided with a plurality of openings 63 so that when the rubber is vulcanized thereto it will flow into said openings thus providing a bond and anchorage for the rubber member onto said base.

Operation of a device constructed and assembled as described is as follows:

Fluid entering the inlet port 5 will contact the poppet 60 in said port. Turning of the shaft 29 then will cause rotation of the double-acting cams 45 and 46 on said shaft, and the rollers 51 on the guide will follow the cam tracks 47. I preferably provide a change of course in said cam tracks 47 consisting of an inwardly tapered portion 64 extending into said cam tracks, having opposite thereto a notch portion 65. When the cam follower roller is directed into said notch portion by the inwardly tapered portion 64 the guide 48 will be raised as shown in Fig. 5, thus raising the poppet from the port opening, allowing fluid to enter the cylindrical chamber 8 and the fluid will then contact the poppet 24 seating on the shoulder 23 in the valve housing. Pressure on such poppet will cause the coil spring 25 to be compressed thus opening said poppet allowing the fluid to flow to chamber 3 and then through the outlet port 6. Closing of the valve may be accomplished by further turning of the shaft until the cam follower rollers are raised out of the notch 65, thus lowering the guide which in turn lowers the poppet and closes the inlet port, as shown in Fig. 4.

It will thus be seen that I have provided a double-acting cam with positive action to open and close the valve and to hold the valve in open and closed position. This is an important feature of my invention for the reason that an ordinary valve having a velocity of fluid flowing therethrough will often catch the poppet causing it to open or close according to direction of the flow of the fluid. It will further be seen that the seat in my valve is metal and the poppet or stopper is faced with rubber or other resilient material.

The U-shaped member 58 being made of spring or resilient material provides for over-travel of the parts due to discrepancies in the cam and the distance from the valve seat, also keeping pressure on the cam so that the index notch will function accurately.

It is obvious from the foregoing that I have provided improved details of structure operating in a simple, economical and efficient manner as described and for the purpose set forth.

What I claim and desire to secure by Letters Patent is:

1. A device of the character described comprising, a valve housing having connecting chambers therein and having fluid inlet and outlet ports, a shaft extending through said housing, means for sealing said shaft in said housing, a poppet in one of said chambers for seating in said inlet port, cams on said shaft having trackways in their facing sides, a guide including spaced arms for engaging said shaft and having rollers on its respective sides engaging in said cam trackways said guide having rollers on opposite lower edges thereof for engaging the walls of said chamber, resilient U-shaped members connecting said poppet member to said guide, and means in said cam trackways engaging the rollers on the sides of the guide for opening and closing said valve upon turning of said shaft.

2. A device of the character described comprising, a valve housing having connecting chambers therein forming a throat therebetween and having fluid inlet and outlet ports, a shaft extending through said housing, means for sealing said shaft in said housing, a poppet in one of said chambers for seating in said inlet port, cams on said shaft having trackways in their facing sides, a guide including spaced arms for engaging said shaft and having rollers on its respective sides engaging in said trackways said guide having ears on opposite lower edges thereof provided with rollers for engaging the walls of said chamber for guiding said poppet to its seat, and resilient U-shaped members connecting said poppet member to said guide, said trackways having a tortuous path for opening and closing said valve upon turning of said shaft.

EMMETT F. SARVER.

REFERENCES CITED

The following references are of record in the file of this patent:

UNITED STATES PATENTS

| Number | Name | Date |
| --- | --- | --- |
| 369,062 | Kersey | Aug. 30, 1887 |
| 1,462,857 | Hiller | July 24, 1923 |
| 1,524,225 | Allen | Jan. 27, 1925 |
| 1,677,598 | Resek | July 17, 1928 |
| 1,797,591 | Sartakoff | Mar. 24, 1931 |
| 2,074,240 | Saunders | Mar. 16, 1937 |
| 2,173,210 | Lieb | Sept. 19, 1939 |
| 2,267,057 | Verner | Dec. 23, 1941 |

FOREIGN PATENTS

| Number | Country | Date |
| --- | --- | --- |
| 343,553 | Germany | 1921 |